United States Patent
Lu et al.

(10) Patent No.: US 7,336,228 B2
(45) Date of Patent: Feb. 26, 2008

(54) STACK-UP CONFIGURATION FOR A WIRELESS COMMUNICATION DEVICE

(75) Inventors: Lin Lu, San Diego, CA (US); Sidney Sitachitt, Carlsbad, CA (US)

(73) Assignee: Kyocera Wireless Corp, San Diego, CA (US)

(*) Notice: Subject to any disclaimer, the term of this patent is extended or adjusted under 35 U.S.C. 154(b) by 229 days.

(21) Appl. No.: 11/014,541

(22) Filed: Dec. 15, 2004

(65) Prior Publication Data

US 2006/0233356 A1    Oct. 19, 2006

(51) Int. Cl.
*H01Q 1/24* (2006.01)
(52) U.S. Cl. ................................... 343/702
(58) Field of Classification Search ................ 343/702, 343/745, 866; 340/445; 455/575.3
See application file for complete search history.

(56) References Cited

U.S. PATENT DOCUMENTS

| | | | | |
|---|---|---|---|---|
| 5,365,247 A * | 11/1994 | Van der Veen et al. | ..... | 343/702 |
| 5,825,285 A * | 10/1998 | Sawafuji | ..... | 340/445 |
| 5,918,189 A * | 6/1999 | Kivela | ..... | 455/575.1 |
| 6,603,431 B2 * | 8/2003 | Talvitie et al. | ..... | 343/702 |
| 6,978,165 B2 * | 12/2005 | Martinez et al. | ..... | 455/575.7 |
| 2002/0187806 A1 * | 12/2002 | Jang | ..... | 455/556 |
| 2003/0013478 A1 | 1/2003 | Kuchiishi et al. | | |
| 2004/0204009 A1 | 10/2004 | Cheng et al. | | |
| 2005/0282593 A1 * | 12/2005 | Spence et al. | ..... | 455/575.3 |

FOREIGN PATENT DOCUMENTS

| GB | 2364613 | 1/2002 |
|---|---|---|
| GB | 2390957 | 1/2004 |

* cited by examiner

*Primary Examiner*—Huedung Mancuso

(57) ABSTRACT

A stack-up configuration for a wireless communication device includes a display and keypad on a front face of a housing for the device. A battery for providing power to the components of the wireless communication device is stacked behind the display. A circuit board that holds processing and RF circuitry for the wireless communication device is stacked behind the battery, with a top surface of the circuit board adjacent the battery. Noisy circuitry on the circuit board is covered by shielding on a back surface of the circuit board. An external or internal antenna is connected to the circuit board at a feed point. The antenna in one embodiment of the invention is stacked behind the circuit board, that is, between a back face of the housing and the back surface of the circuit board. The location of the battery between the display and the circuit board lowers the amount of energy radiating from the wireless communications device in the concerned near field range.

18 Claims, 3 Drawing Sheets

STACK-UP CONFIGURATION FOR A WIRELESS COMMUNICATION DEVICE

FIELD OF THE INVENTION

This invention relates generally to a component configuration in a wireless communication device, and more specifically to a component stack-up configuration of a wireless communication device to reduce a Specific Absorption Rate (SAR) level.

BACKGROUND

As the wireless communication industry continues to grow, the demand increases for smaller and smaller wireless communication devices. A wireless communication device also may be referred to herein as a "wireless device," a "handset," a "cellular phone", a "mobile phone", etc. Decreasing the size of a wireless device presents design challenges including the challenge of placing device components within a smaller volume. Additional challenges include maintaining acceptable levels of radio frequency (RF) energy radiated from the wireless device in a concerned near-field range while maintaining radiated efficiency of the device.

When the RF module is transmitting, a power amplifier magnifies an electronic signal and then broadcasts this modulated energy into the air through the antenna. A first portion of this energy travels through free space to the target destination. Another portion of this energy is dissipated as heat within the device. Finally, some of the energy is absorbed by objects near the device, including the user's body.

The power density surrounding an antenna of a wireless device varies as a function of, for example, distance from the antenna and orientation of the antenna. The fields around an antenna typically are divided into two regions. A first region is one near the antenna called the near field, and a second region is one at a large distance from the antenna called the far field. The boundary between the two is often taken to be at the radius, R, where $R=2L^2/\lambda$, where L is the maximum dimension of the antenna and $\lambda$ is the wavelength. The far field is the region where the radiation pattern is independent of distance from, e.g., a transmitting antenna. The near field is the region that is closest to the transmitting antenna and in which the field pattern depends on the distance from the antenna.

Limits for safe human exposure to radio frequency (RF) energy radiated from a wireless device in the near field are given in terms of a unit referred to as the Specific Absorption Rate (SAR). Specific Absorption Rate is an amount of radio frequency energy absorbed by the body when using a radio transmitter. The acceptable SAR level varies from country to country. The U.S. Federal Communications Commission (FCC) limits the amount of acceptable exposure to RF energy from a mobile phone to a specific local (or spatial peak) SAR level of 1.6 watts per kilogram of tissue (1.6 W/kg). When the wireless device is operating within these limits, the device poses no hazards to users. Thus, compliance with applicable near-field exposure limits must be considered in any mobile phone design.

The SAR levels of various phones vary due in part to the fact that SAR is a function of many different parameters, including device geometry, transmission frequency, amplifier power level, antenna location, etc. A typical stack-up configuration of a prior art cellular phone 70 is shown in FIG. 4. The phone 70 is encased in a housing 88 having a front face 84 and a back face 86. Components of the phone 70 include a circuit board 74 that holds processing circuitry (not shown) for controlling a display 72, a key pad 80, RF and other noisy, i.e., radiating, components 90 enclosed by canister-type shielding 76, and other device components (not shown). An antenna 82 is coupled through a feed point 92 to a transmitter and receiver on the circuit board 74. A battery 78 also is encased within the housing 88 for powering the components of the device 70.

Continuing with FIG. 4, the prior art stack-up configuration for the phone 70 is a display 72 on the front face 84 of the housing 88, which is stacked above the circuit board 74, which may have one or more canister-type shields 76 above and below the circuit board for shielding noisy components. The battery 78 is stacked below the circuit board, and typically is accessible through a battery door 94 on the back surface 86 of the housing 88. In addition to the canister-type shields 76 covering the noisy components residing on the circuit board, the phone 70 of the prior art requires additional shielding (not shown), referred to herein as compliance shielding, to bring the phone 70 into SAR compliance since high energy density appears immediately above the front face 84. This additional shielding may include foil, RF absorbing material, metalized plastic, and metal brackets, etc.

The shielding within the phone 70 that is used to comply with acceptable SAR levels continues to present a significant burden in the manufacture of the phone in terms of actual design efforts, iteration of compliance testing, and costs for the additional compliance shielding. The above described challenges are amplified as phone sizes decrease. Thus, it is desirable to continue innovations in the industry that lower the SAR level of the phone before the addition of the compliance shielding, and that reduce final costs of the phone in design and material costs.

SUMMARY

A wireless communication device includes a housing with a back face and a front face for holding a display and keypad. A battery for providing power to the components of the wireless communication device sits within the housing and at least partially between the display and a front surface of a circuit board. The circuit board holds processing and RF circuitry for the wireless communication device. The back surface of the circuit board holds radiating circuit components which are shielded by canister-type shielding. An external or internal antenna is connected to the circuit board at a feed point. The antenna in one embodiment of the invention is stacked below the circuit board, that is, between the back face of the housing and the back surface of the circuit board.

The placement of the battery in a space between the display and the circuit board decreases the Specific Absorption Rate measured at a set distance above the front face of the housing as compared to a traditional device stack up configuration in which the battery is placed below the circuit board and is accessible from a back face of the housing. The decrease in the SAR level decreases the amount of additional compliance shielding required to comply with acceptable SAR levels. This particularly advantageous as the size of wireless devices continue to decrease.

The stack up configuration of the battery and display above the circuit board also can provide a cavity having an increased volume for holding a speaker. The volume of the cavity is determined by the combined heights of the battery and the display, the width of the circuit board or housing, and the difference in the length of the circuit board and the battery. The increased cavity volume can improve the quality of sounds from the speaker of the wireless communication device.

BRIEF DESCRIPTION OF THE DRAWINGS

The described embodiments are to be considered in all respects as illustrative and not restrictive. It should also be understood that the invention is not limited to the particular embodiments illustrated and described herein, but is capable of many rearrangements, modifications, and substitutions without departing from the scope of the invention. As such, the details of the present invention, both as to its structure and operation, may be gleaned in part by study of the accompanying drawings described below, in which like reference numerals refer to like parts.

DETAILED DESCRIPTION

As the wireless industry expands, cell phone manufactures are developing innovative wireless devices that are smaller and smaller in size. The decreasing size of phones exposes more radio frequency (RF) energy to the user's head, measured by a Specifc Absorption Rate (SAR) level, in the near field and radiates less RF energy in the far field. Thus, to reduce the human exposure and improve the radiated efficiency while maintaining a small-sized phone is very challenging. The present invention addresses this challenge by presenting an innovational stack-up configuration of the components within the phone.

Figure 1:
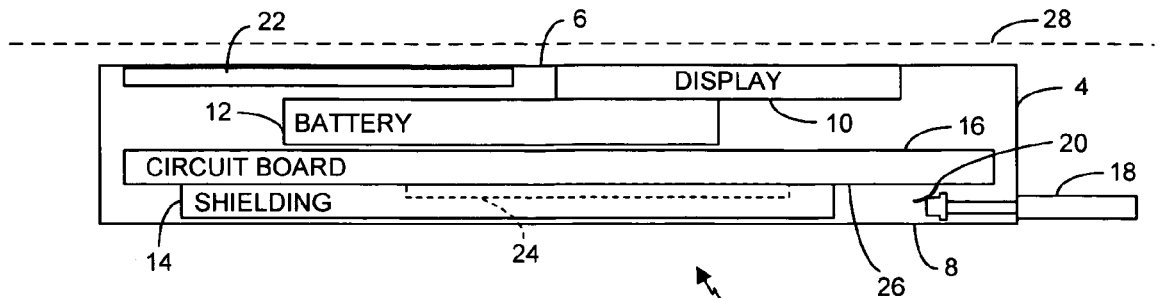
FIG. 1 is a side view of a stack-up configuration of an embodiment of the invention, having an external antenna.
Figure 4:
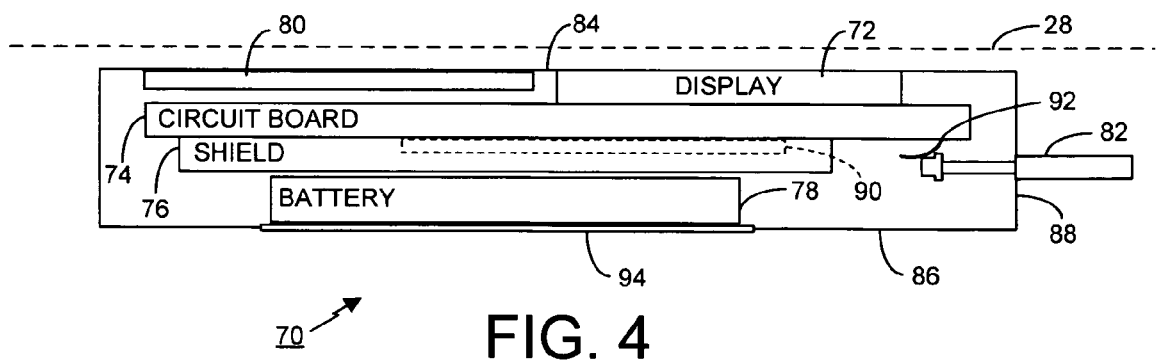
FIG. 4 is a side view of a stack-up configuration of the prior art.

As discussed above, the prior art phones as illustrated in FIG. 4 have a traditional mechanical stack-up from a top surface of a phone to a back surface. The traditional stack-up is a display, e.g., liquid crystal display (LCD), on the top surface, followed by a main board, shielding and a battery. Typically, the antenna feed point is on the main board. In contrast, the stack-up configuration of one embodiment is illustrated in FIG. 1. A wireless device 2 is enclosed in a housing 4 having a front face 6 and a back face 8. The top surface 6 of the wireless device 2 holds the display 10 and keypad 22. A battery 12 is housed behind the display and above a circuit board 16. The circuit board 16 holds the majority of the electronic circuitry for the wireless device 2 including noisy components 24, that is, components that radiate RF energy. The radiating components 24 are shielding by shielding materials 14 such as canisters, RF absorbing material, metalized plastic covers, etc. In the illustrated embodiment of FIG. 1, the antenna 18 is an external antenna 18 having an antenna feed point 20 on the back surface 26 of the circuit board 16. RF energy of a modulated RF signal radiates from the antenna 18 creating the near fields and the far fields.

The mechanical stack up configuration of FIG. 1 decreases the amount of energy radiated in the concerned near field as compared to the prior art stack-up configuration of FIG. 4. Specifically, the placement of the battery 12 between the display 10 and the circuit board 16 contributes to the decrease in the radiated energy in the concerned near field area. As discussed below, simulation for energy density distribution in free space is performed at a plane 28 adjacent the front face 6 of the device 2. The plane 28, which is 0.5 mm above the front face, also approximates the placement of the user's head when using the device 2.

Figure 5:
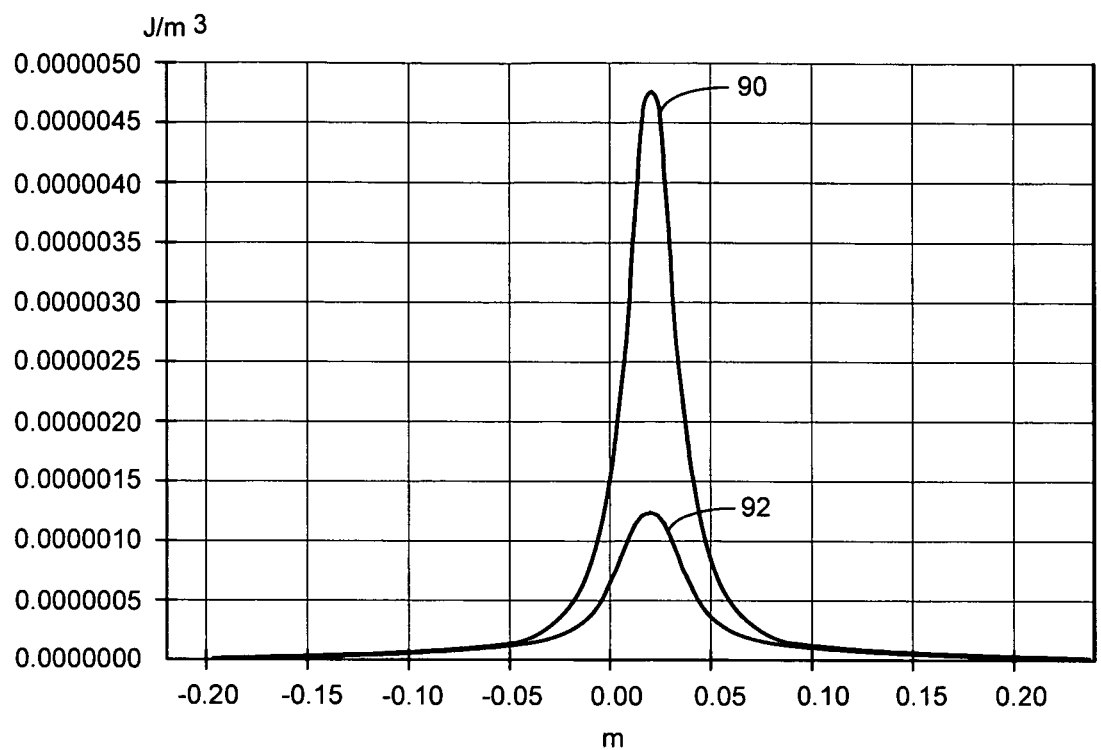
FIG. 5 is a graph of the energy density of the near field for the stack-up configuration of the present invention as compared the near field for the stack-up configuration of the prior art, given a distance from the front face 84 in FIG. 4 or the front face 6 in FIG. 1.

FIG. 5 is a graph of the free space energy density (J/m$^3$) distributed on a plane 28 in FIG. 4 for a traditional stack-up, as shown by curve 90, and distributed on a plane 28 in FIG. 1 for an embodiment of the present invention stack-up, as shown by curve 92. Both simulations are done without including the compliance shielding as discussed above. The plane 28 is 0.5 mm above the front face. The sample simulation results taken on a plane 28 as shown in FIGS. 1 and 4 are shown for illustrative purposes only. Other simulations may result in varying values for the energy density, and the illustrated example should not be considered as limiting for the embodiments of the present invention. The graph shows, for the concerned area, that the maximum energy density above the tradition stack-up of FIG. 4 is approximately 3.8 times the energy density above the innovational stack-up configuration of FIG. 1.

In one sample SAR performance simulation of the prior art stack-up configuration of FIG. 4, with a phone thickness from the front face 84 to the back face 86 of 22 mm, the average SAR based on IEEE standard 1529 is 2.10 W/kg at 24 dBm. This simulation result is taken without the compliance shielding as discussed above. Thus, for this particular sample prior art phone to attain the required SAR standard of 1.6 W/kg, the device housing would have to include additional compliance shielding. In comparison, the innovational stack-up of FIG. 1, with a same thickness of 22 mm, has an averaged SAR based on IEEE-1529 of 1.58 W/kg at 24 dBm. For this simulation analysis, the SAR value is reduced for the stack-up configuration of the present invention by approximately 24.8%. Thus, the amount of compliance shielding required to bring the sample present invention phone into compliance with the SAR standard is reduced. This reduction represents cost savings in design time, manufacture time and materials.

Figure 6:
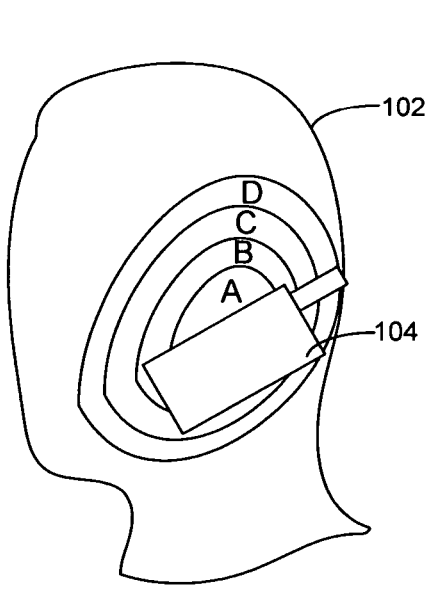
FIG. 6 illustrates radiation levels of a prior art stack-up configuration with respect to the surface of a user's head.
Figure 7:
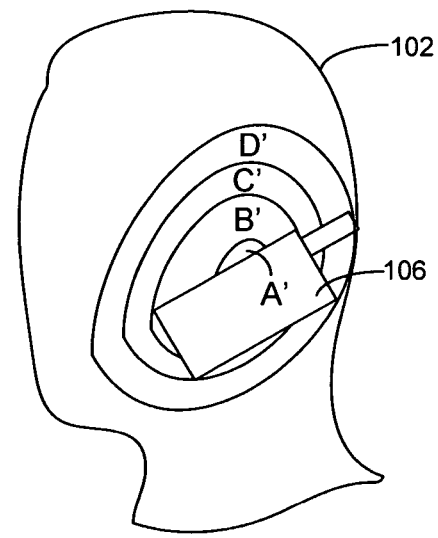
FIG. 7 illustrates decreased radiation levels of an embodiment of the present invention with respect to the surface of a user's head.

FIGS. 6 and 7 are provided to illustrate a SAR performance as described above, and are based on the sample simulations. FIG. 6 illustrates a user's head 102 with a prior art phone 104 against his or her head 102. Specific Absorption Rate power density "bands" A, B, C, D in W/kg decrease with distance from the source 104. Band A represents the area on the user's head absorbing the highest power density. In comparison, the SAR power densities of an embodiment of the present invention are reduced as shown in FIG. 7. As shown with reference to bands A', B', C', D', the area of the user's head 102 absorbing the highest power density is significantly smaller than that of the prior art.

A simulated radiated performance in free space, in a far field, for a sample traditional stack-up has radiation efficiency of 92.84% with a directivity of 2.73 dBi, and a gain of 2.41 dBi. In comparison, the stack-up configuration of a sample embodiment of the present invention yields a radiation efficiency of 92.86% with a directivity of 2.75 dBi, and a gain of 2.43 dBi. Thus, both the traditional stack-up and the innovated stack-up have the same radiated performance in free space. However, in a far field, for a prior art sample next to the head, the simulation results show a radiated efficiency of 22.77% with a directivity of 5.98 dBi, and a gain of −0.45 dBi. In comparison, the stack-up configuration of a sample embodiment of the present invention yields a radiation efficiency of 32.72% with a directivity of 5.89 dBi, and a gain of 1.04 dBi. Therefore, the innovational stack-up configuration has a better antenna efficiency of approximately 10% in a far field as compared to the traditional stack-up while the sample is held next to a human head.

Figure 2:
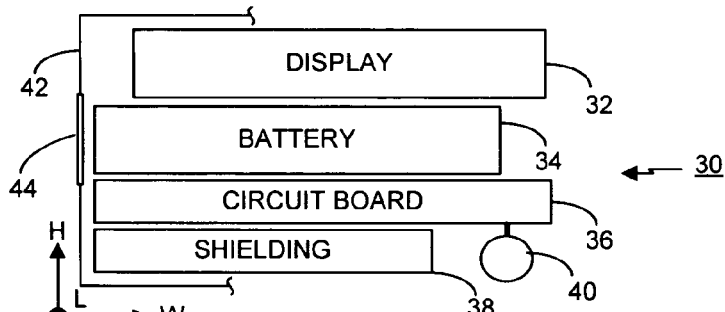
FIG. 2 is an end view of a stack-up configuration of a second embodiment of the invention.

FIG. 2 illustrates an end view of the device 30 of another embodiment of the invention. The stack up configuration along a height axis, H, is the circuit board 36 above the shielding 38 and external antenna 40, the battery 34 above the circuit board 36, and the display 32 above the battery 34. As shown, the device 30 does not require a particular placement of the components with respect to a length axis L and width axis W of the device 30 to obtain a reduction in the SAR. In one embodiment of the device 30 of FIG. 2, the battery 34 is accessible through a battery door 44 in the housing 42.

Figure 3:
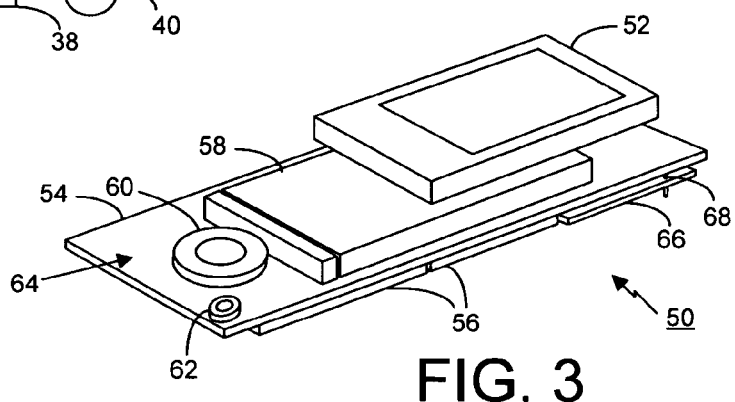
FIG. 3 is a perspective view of a wireless device assembly of another embodiment of the invention having an internal antenna.

FIG. 3 is a perspective view of another embodiment of the wireless device stack-up configuration 50 having an internal antenna 66 connected to the circuit board 54 by a feed point 68. The battery 58 is stacked below the display 52 and keypad (not shown), and above the circuit board 54. Radiators and other components such as memory on the bottom surface of the circuit board 54 are shielded by shields 56. In this embodiment, the speaker 60 is placed in the volume 64 left open from the stack-up of the battery 58 and the display 52. This volume 64 improves the sound quality of the speaker 60. Also shown in this space 64 is the microphone 62.

Figure 8:
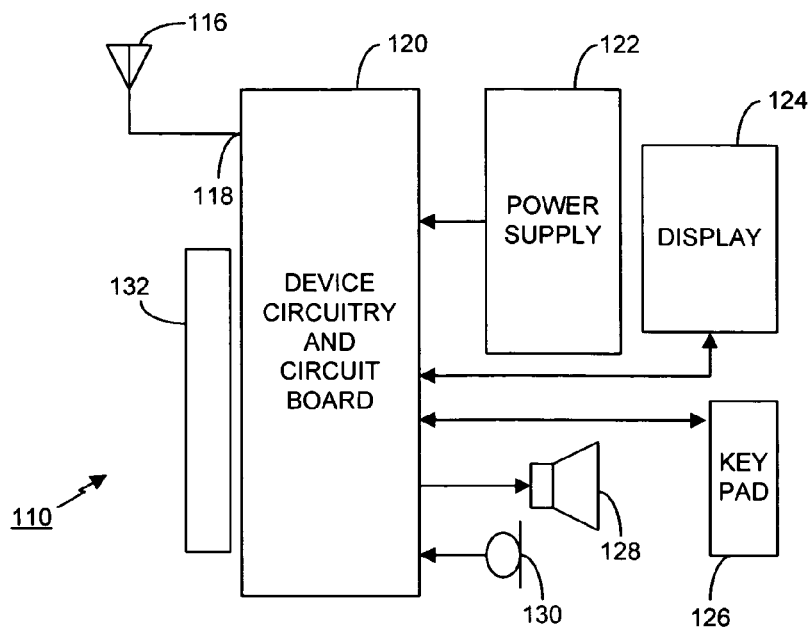
FIG. 8 is a block diagram of the wireless communication device of one embodiment of the stack-up configuration.

FIG. 8 is a block diagram 110 of the components of an embodiment of the present invention showing a relative position with respect to a housing front and back surfaces. The display 124 and keypad 126 on a front face of the device 110 are controlled by device circuitry on the circuit board 120. A speaker 128 and microphone 130 send and receive audio signals to the device circuitry 120. The power supply 122, e.g., a battery, supplies the components of the device 110 with power through the circuit board 120. An antenna 116 is connected by a feed point 118 to the circuit board 120. Shielding 132 cover at least some of the circuitry on the circuit board 120.

Figure 9:
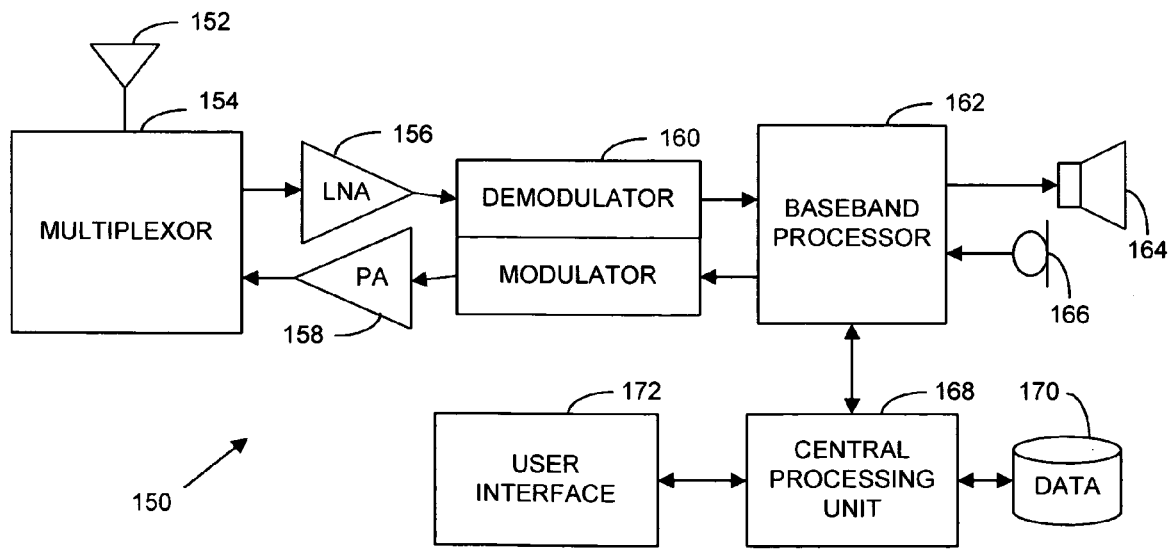
FIG. 9 is a circuit diagram of device circuitry for an embodiment of the invention.

FIG. 9 is a block diagram illustrating a wireless communication device 150 that may be used in connection with the various embodiments described herein. However, other wireless communication devices and/or architectures may also be used, as will be clear to those skilled in the art. In the illustrated embodiment, wireless communication device 150 comprises an antenna 152, a multiplexor 154, a low noise amplifier ("LNA") 156, a power amplifier ("PA") 158, a modulation circuit 160, a baseband processor 162, a speaker 164, a microphone 166, a central processing unit ("CPU") 168, a data storage area 170, and a user interface 172. In the wireless device 150, radio frequency ("RF") signals are transmitted and received by antenna 152. Multiplexor 154 acts as a switch, coupling antenna 152 between the transmit and receive signal paths. In the receive path, received RF signals are coupled from a multiplexor 154 to LNA 156. LNA 156 amplifies the received RF signal and couples the amplified signal to a demodulation portion of the modulation circuit 160. The demodulator strips away the RF carrier signal leaving a base-band receive audio signal, which is sent from the demodulator output to the base-band processor 162. If the base-band receive audio signal contains audio information, then baseband processor 162 decodes the signal, converts it to an analog signal, and sends it to the speaker 164.

The baseband processor 162 also receives analog audio signals from the microphone 166. These analog audio signals are converted to digital signals and encoded by the base-band processor 162. The base-band processor 162 also codes the digital signals for transmission and generates a base-band transmit audio signal that is routed to the modulator portion of modulation circuit 160. The modulator mixes the base-band transmit audio signal with an RF carrier signal generating an RF transmit signal that is routed to the power amplifier 158. The power amplifier 158 amplifies the RF transmit signal and routes it to the multiplexor 154 where the signal is switched to the antenna port for transmission by antenna 152. The baseband processor 162 is also communicatively coupled with the central processing unit 168 which has access to a data storage area 170. The central processing unit 168 is configured to execute instructions (i.e., computer programs or software) that can be stored in the data storage area 170. Computer programs can also be received from the baseband processor 162 and stored in the data storage area 170 or executed upon receipt.

The description and drawings contained herein are particular embodiments of the invention and are representative of the subject matter broadly contemplated by the invention. However, the invention encompasses other embodiments that will be obvious to those skilled in the art. Accordingly, the scope of the invention is limited only by the appended claims.

We claim:

1. An assembly stack-up configuration for a wireless communication device, comprising:
    a main circuit board for holding a plurality of communication circuits, the main circuit board comprising a top surface and a bottom surface;
    a battery having a battery upper surface and a battery lower surface, the battery lower surface located above the top surface of the main circuit board;
    a display positioned above at least a portion of the battery upper surface such that the battery is positioned between the top surface of the main circuit board and the display; and
    at least one shield located below the bottom surface of the main circuit board for shielding at least one circuit of the plurality of communication circuits.

2. The assembly stack-up configuration of claim 1, further comprising an antenna connected to the main circuit board.

3. The assembly stack-up configuration of claim 2, wherein the antenna is located below the bottom surface of the main circuit board.

4. The assembly stack-up configuration of claim 2, wherein the antenna is an internal antenna having a feed point connect to the main circuit board.

5. The assembly stack-up configuration of claim 1, further comprising:
    a housing for enclosing the main circuit board, the battery, the at least one shield, and at least a portion of the display, the housing comprising:

at least one side surface substantially perpendicular to the top surface of the main circuit board; and a battery access panel located on the at least one side surface for removing the battery from the housing.

6. The assembly stack-up configuration of claim 1, further comprising:

a housing for enclosing the main circuit board, the battery, the at least one shield, and at least a portion of the display, the housing comprising an end surface; and a speaker residing on the top surface of the main circuit board and within an open volume created between the end surface of the housing and the stack-up configuration of the battery and the display.

7. A wireless communication device assembly comprising:

a housing further comprising an upper housing surface, a lower housing surface, and at least one side surface;

at least one circuit board housed in the housing wherein each circuit board comprises a top surface and a bottom surface, the at least one circuit board for holding processing circuitry;

a display housed in the housing adjacent to the top surface of the housing;

a battery housed in the housing, and positioned between the display and the top surface of the at least one circuit board; and a shielding means located below the lower surface of at least one circuit board for shielding the at least one circuit board.

8. The wireless communication device of claim 7, further comprising:

transceiver circuitry residing at least partially on the at least one circuit board; and an antenna connected to the transceiver circuitry and housed in the housing adjacent the at least one circuit board.

9. The wireless communication device of claim 8, wherein the antenna is an internal antenna.

10. The wireless communication device of claim 8, wherein the antenna is an external antenna.

11. The wireless communication device of claim 7, wherein the battery is accessible through a side panel on the at least one side surface of the housing.

12. A method for assembling a wireless communication device within a housing, comprising the steps of:

attaching a circuit board with a plurality of electrical components in a bottom portion of the housing, the circuit board comprising a top surface and a lower surface;

attaching a battery within the housing and above the top surface of the at circuit board;

attaching a display within the housing that is above the battery; and attaching a shield to the bottom surface of the circuit board for shielding at least one electrical component of the plurality of electrical components.

13. The method of claim 12, further comprising the step of:

attaching an antenna to the lower surface of the circuit board.

14. The method of claim 12, wherein the antenna is an internal antenna, further comprising the steps of:

attaching the internal antenna within the housing between the circuit board and the bottom portion of the housing; and connecting the internal antenna to a feed point on the board.

15. The method of claim 12, further comprising the step of:

attaching a battery door to a side surface of the housing, the battery door for accessing the battery.

16. The method of claim 13, further comprising the step of:

attaching a speaker to the top surface of the circuit board and within an open volume created between an end surface of the housing and the battery.

17. A wireless communication device comprising:

a power supply connected to a top surface of a circuit board, the power supply for powering electronic components of the wireless communication device, the power supply having a first surface adjacent to the circuit board and a second surface substantially parallel to the first surface;

the circuit board for holding a plurality of electrical circuits comprising radio frequency (RF) circuits for receiving and transmitting RE signals and processing circuits for controlling the electronic components, wherein the circuit board comprises a top surface and a bottom surface;

a display connected to the circuit board and above the second surface of the power supply, the display controlled by the processing circuits; and at least one shield that is located below the bottom surface of the circuit board for shielding at least one circuit of the plurality of communication circuits.

18. The wireless communication device of claim 17, further comprising:

an antenna connected to the RE circuits by a feed on the circuit board;

wherein the antenna is one of an internal antenna and an external antenna.

* * * * *